United States Patent
Hintzen

(10) Patent No.: US 8,534,678 B2
(45) Date of Patent: Sep. 17, 2013

(54) WHEEL SUSPENSION

(75) Inventor: Ralf Hintzen, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/285,591

(22) Filed: Oct. 31, 2011

(65) Prior Publication Data

US 2012/0104716 A1    May 3, 2012

(30) Foreign Application Priority Data

Oct. 29, 2010  (DE) .......................... 10 2010 060 251

(51) Int. Cl.
*B60G 21/045* (2006.01)
(52) U.S. Cl.
USPC ................. 280/5.506; 280/124.106
(58) Field of Classification Search
USPC ............. 280/124.106, 124.107, 5.502, 5.506, 280/5.507
See application file for complete search history.

(56) References Cited

U.S. PATENT DOCUMENTS

| 4,881,749 | A | 11/1989 | Bausch | |
|---|---|---|---|---|
| 6,039,326 | A * | 3/2000 | Agner | 280/5.506 |
| 6,250,416 | B1 * | 6/2001 | Pluschke et al. | 180/404 |
| 6,293,561 | B1 | 9/2001 | Goetzen | |
| 7,155,906 | B2 * | 1/2007 | Yokota et al. | 60/403 |
| 7,213,676 | B2 * | 5/2007 | Soeda et al. | 180/417 |
| 2010/0170760 | A1 * | 7/2010 | Marking | 188/299.1 |
| 2011/0265544 | A1 * | 11/2011 | Micklisch et al. | 72/351 |

FOREIGN PATENT DOCUMENTS

| DE | 1780418 A | 12/1971 |
|---|---|---|
| DE | 4115880 C2 | 6/1993 |
| DE | 19956769 A1 | 8/2000 |
| DE | 10045956 A1 | 3/2002 |
| DE | 102008000492 A1 | 10/2006 |
| DE | 102008057052 A1 | 7/2010 |

* cited by examiner

*Primary Examiner* — Faye M. Fleming
(74) *Attorney, Agent, or Firm* — L.C. Begin & Associates, PLLC

(57) ABSTRACT

The invention relates to a wheel suspension for a motor vehicle, which has a tie rod (1) formed from two rod parts (2, 3). In order to achieve speed-dependent adaptation of the compliance of the tie rod, the proposal is that the first rod part (2) have a compensating space (4) filled with a compensating medium, in which the other, second rod part (3) is arranged by means of the engagement end (7) thereof, the compensating space (4) being connected to a, preferably pressurized, medium reservoir (18) via a switching element (17) arranged at a connecting element (19).

12 Claims, 1 Drawing Sheet

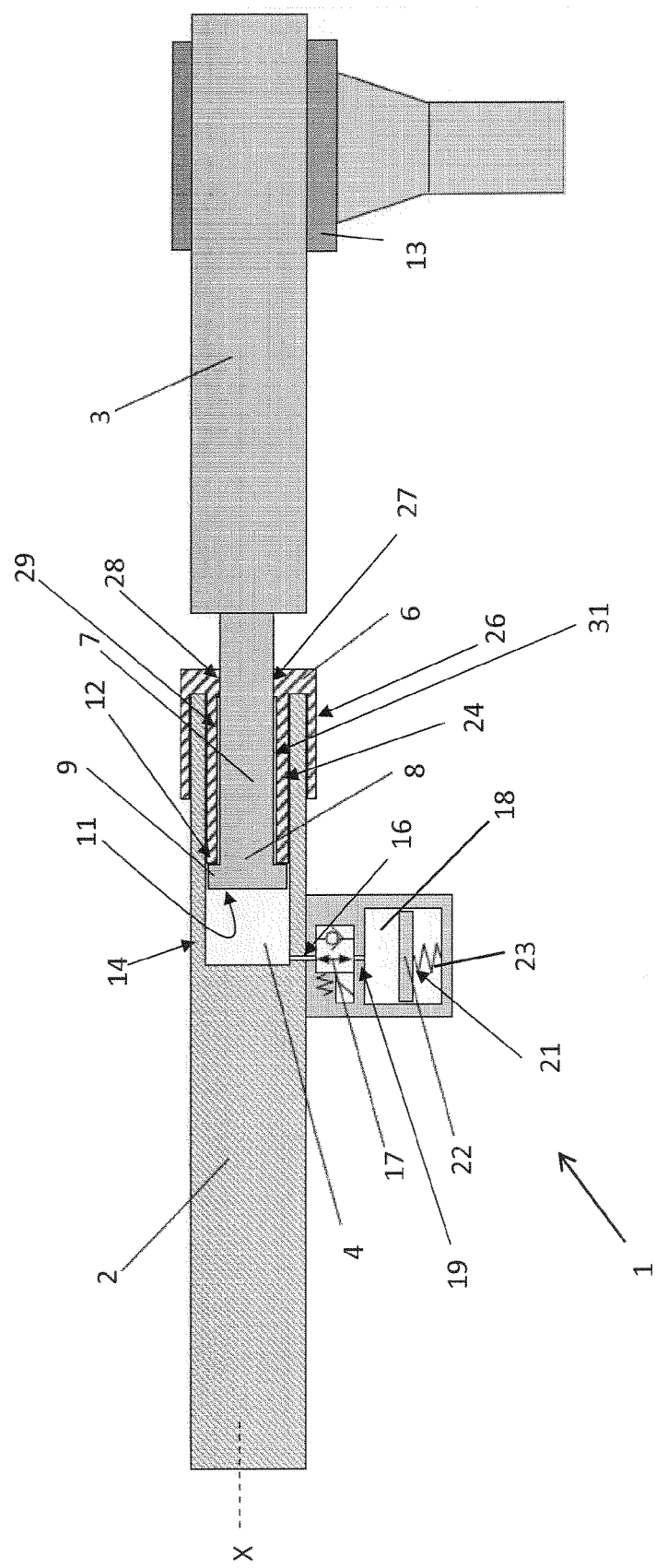

WHEEL SUSPENSION

BACKGROUND OF THE INVENTION

The invention relates to a wheel suspension for a motor vehicle of the type stated in the preamble of claim 1, the wheel suspension having a tie rod formed from two rod parts. Wheel suspensions of this kind are used in motor vehicles, e.g. at the driven axle.

In designing such wheel suspensions, a number of aspects have to be taken into account. On the one hand, there is a demand that the steering feel should be very precise at low and moderate vehicle speeds. Relatively stiff tie rods and thrust rods with little springiness or compliance are required for this purpose. However, this results in excessive responsiveness in the steering at high vehicle speeds, making the steering comparatively oversensitive, which is an unpleasant experience for the user. It is therefore better at high vehicle speeds if the tie rod is more flexible and the thrust rod has a greater springiness or compliance. An ideal wheel suspension then falls within a range between good responsiveness of the steering at low vehicle speeds and high stability at high vehicle speeds.

DE 10 2008 000 492 A1 describes a wheel suspension for a vehicle. The tie rod consists of two elements comprising an adjustment means that has an integrated spring band mechanism. This is used to vary the length of the tie rod by guiding the two elements of the tie rod into one another or moving them out of one another telescopically. The spring band mechanism is driven by electric motor in order to obtain the various positions. The disadvantage here is that this electric motor drive is comparatively complex and that a control system is additionally required for this purpose.

SUMMARY OF THE INVENTION

It is the underlying object of the invention to create a wheel suspension with a flexible and adaptable tie rod springiness or compliance, the design and production of which tie rod are simple and economical.

According to the invention, the object is achieved by a wheel suspension having the features of claim 1, the first rod part having a compensating space filled with a compensating medium, in which the other, second rod part is arranged by means of the engagement end thereof, the compensating space being connected to a, preferably pressurized, medium reservoir via a switching element arranged at a connecting element.

It is advantageous if the compensating space is of cylindrical design when viewed in longitudinal section and is open at one end, the engagement end of the second rod part having a piston rod, on the end of which an effective piston surface is arranged. On the opposite side from the effective piston surface, the engagement end has an annular surface.

In this way, what is in effect a piston-cylinder unit is advantageously formed, with the second rod part being accommodated with its piston rod and the effective piston surface arranged thereon in the compensating space of the first rod part.

It is expedient according to the invention if the connecting element has a duct, or is preferably embodied as a duct, which is introduced into a wall section of the compensating space, the duct being introduced into the wall section of the compensating space on a side oriented toward the effective piston surface of the engagement end.

It is expedient if the medium reservoir has a pressurization element in order to create an adjustable or adaptable pressure level in the medium reservoir, a preferred embodiment of the pressurization element having a spring-loaded pressure plate. In this case, the pressure plate has a surface oriented toward the switching element and an energy accumulator side, which is situated on the opposite side therefrom and attached to which is a spring that is supported at the other end on a wall of the medium reservoir. Helical springs or diaphragm springs can be used as springs, to mention just a few non-limitative examples. It is of course also possible to provide other suitable pressurization elements, e.g. gas pressure cushions with sliding pistons or diaphragms.

As already stated, the first rod part has the cylindrical compensating space open at one end. To seal off said space relative to the surroundings, provision is advantageously made to form a cap-type cover with a central opening and two contact lips spaced apart in the vertical direction when viewed in longitudinal section. In this way, a receiving space is formed between an inner contact lip and an outer contact lip, said receiving space being matched to the wall thickness of the receiving space, thus enabling the cap-type cover simply to be placed on the open end in a manner which is sufficiently leaktight and secure in terms of position. It is, of course, also possible for the cap-type cover to be screwed on, for which purpose it is, of course, possible to provide corresponding threads. In a preferred embodiment, provision can be made for the inner contact lip to be made longer when viewed in longitudinal section than the outer contact lip. The inner contact lip serves inter alia as a guide for the piston rod, with a longer length improving guidance—The length of the outer contact lip, on the other hand, can be designed for adequately firm seating of the cap-type cover.

The engagement end is passed through the central opening of the cap-type cover.

It is advantageous if the central opening has two opening sections, of which a first opening section has a smaller diameter than the adjoining second opening section. The first opening section extends from an outer side in the direction toward the inner side and thus merges as it were stepwise into the second opening section. It is, of course, also possible for a sloping transition to be provided instead of the stepwise transition. It is expedient if the first opening section has an inside diameter such that it rests against the engagement end or piston rod thereof in a sealing manner.

The cap-type cover thus advantageously has a dual function. On the one hand, the cover serves to seal off the compensating space at the open end thereof and, furthermore, linear guidance of the engagement end or piston rod thereof is achieved. It is also advantageous that the inner contact lips are relatively long, enabling them also to act as a stop or motion limiter for the engagement end. The axial extent of the inner contact lips can thus be matched to the desired compliance figures, further details thereof being given below.

In a preferred embodiment, the compensating medium is a fluid, more specifically a hydraulic oil. Such oils are widely known. Moreover, they have the appropriate properties for the purpose that the invention is intended to accomplish here.

The switching element is preferably designed as a solenoid valve.

The invention offers the advantage that the wheel suspension can be of particularly simple and economical design and that, by virtue of the variation in the length of the tie rod, it is also possible to vary the springiness or compliance in order to adapt to the different conditions at different speeds. This allows a wheel suspension which has sufficient accuracy and good response behavior at low vehicle speeds but, at the same time, does not respond in an excessively unstable and oversensitive manner at high vehicle speeds. Moreover, the wheel suspension is simple and economical to manufacture, and this is likewise advantageous.

On the one hand, the medium reservoir serves to accommodate the compensating medium displaced from the compensating space. The switching element is then arranged between the compensating space and the medium reservoir.

The medium reservoir is advantageously pressurized by means of the pressurization element. This can preferably be achieved by providing the spring-loaded pressure plate in the medium reservoir, said plate tending to push the compensating medium back into the compensating space. By means of the interaction between the medium reservoir, the compensating space, the pressurization and the valve, the adjustable springiness or compliance of the tie rod can be set to match the application, preferably according to the differing speeds of the vehicle. However, the design is simple and effective in all cases.

The engagement end of the tie rod, which enters the compensating space, displaces the compensating medium transferred to the medium reservoir by the switching element or solenoid valve. The pressurization of the medium reservoir, on the other hand, means that the compensating fluid has a tendency to push back through the switching element into the compensating space. If the pressurization of the medium reservoir is greater than the tendency of the engagement end of the tie rod to enter the compensating space, the engagement end is pushed back out of the compensating space, and the tie rod returns to the initial position.

It is advantageous according to the invention that the piston-cylinder unit (engagement end in the receiving space) is connected by fluid coupling to the pressurized medium reservoir. This coupling by a column of fluid makes it possible to change the compliance, depending on whether the switching valve is switched on or off. However, stepless adjustment through stepless opening and closure of the switching valve is also possible. At the same time, the design position or initial position, i.e. the length of the tie rod, has fundamentally to be maintained for reasons connected with steering kinematics. Holding the piston rod fast at a position other than the defined design position would produce an unwanted constant change in the steering angle, even without the action of a transverse force. Purely on the basis of external transverse forces during steering at high speed, an activatable compliance can be permitted according to the invention. Retraction of the piston rod against the spring pressure produces a desired countersteering effect. To this extent, activation/deactivation of the switching element is preferred. However, it is also possible to produce advantageous variable damping behavior through stepwise/stepless variation of the aperture cross section in the itching element. However, the switching element should always be slightly open for return flow, not completely closed, to enable, the link, i.e. the tie rod to be pushed back as quickly as possible, that is to say virtually immediately, into the design position, preferably in a manner defined by the inner contact lip, in the case of an equilibrium of forces between a declining transverse force (e.g. transition from cornering to straight ahead travel) and the spring force in the medium reservoir. The spring force of the tuning parameters is advantageous here for transverse force understeer of the desired intensity. The lockable oil column is used as a medium for transmitting force to the piston or piston rod.

Of course, the subject matter according to the invention should be considered independently of driven/non-driven front axles, preferably for steering gears arranged behind the wheel centers. However, the subject matter according to the invention is also conceivable for a rear axle if stability in respect of transverse-force compliance at the tie link, i.e. at the tie rod, is desired at high speed, since it makes sense to have a stiff link at the rear axle too for low/moderate speeds because of the more direct steering response.

BRIEF DESCRIPTION OF THE DRAWINGS

Further advantageous embodiments of the invention are disclosed in the subclaims and in the following description of the figures. The single FIGURE, FIG. 1, shows a schematic longitudinal section through a wheel suspension according to the invention with a two-part tie rod.

DETAILED DESCRIPTION

FIG. 1 shows a tie rod 1 of a wheel suspension. The wheel suspension itself is not shown. The operation and attachment of the tie rod 1 is known, for which reason no details thereof will be given here.

The tie rod 1 is formed by two rod parts 2 and 3. The rod part on the left in the plane of the drawing, i.e. the first rod part 2, has a compensating space 4, which is of cylindrical design when viewed in longitudinal section and is open at one end, e.g. toward the right-hand plane of the drawing.

The compensating space 4 is filled with a compensating medium, preferably a fluid, more preferably a hydraulic oil. To seal off the compensating space 4, a cap-type cover 6 is provided, said cover being described in greater detail below.

The engagement end 7 of the other, i.e. second, rod part 3, which is on the right in the plane of the drawing, passes through the cap-type cover 6 and reaches into the compensating space 4.

By way of example, the engagement end 7 has a piston rod 8 that has a flange 9 at the end, said flange having an effective piston surface 11 and an annular surface 12 on the opposite side therefrom. The piston rod 8 has a smaller diameter than the rest of rod part 3.

By way of example, a ball joint 13 is arranged on rod part 3, at the opposite end from the engagement end 7, but the way in which the first rod part 2 is attached is not shown.

As illustrated, the compensating space 4 is bounded by a wall 14. A connecting element 16, preferably embodied as a duct 16, is formed in the wall 14. The duct 16 can be drilled.

The duct 16 is arranged at the opposite end from the open side of the compensating space 4, which is closed by means of the cap-type cover 6.

Connected to the duct 16 is a switching element 17 which, for its part, is connected to a medium reservoir 18, for which purpose a connecting duct 19 is provided.

The switching element 17 can be embodied as a solenoid valve 17.

A pressurization element 21 is arranged in the medium reservoir 18. By way of example, the pressurization element 21 has a spring-loaded pressure plate 22, which is fixed on a wall of the medium reservoir 18 in such a way that it can be moved axially by means of an energy accumulator 23 or spring 23 in the direction of or counter to the spring force, i.e. in the direction of the connecting duct 19 or away from the latter.

The cap-type cover 6 has a central opening 27 and two contact lips 24 and 26 spaced apart in the vertical direction when viewed in longitudinal section.

In the illustrative embodiment depicted, an inner contact lip 24 is longer when viewed in the axial direction than the outer contact lip 26. It is, of course, also possible for both contact lips 24, 26 to be of the same length or for the outer lip to be longer than the inner lip. The spacing between the two contact lips 24 and 26 can preferably be made such that the cover 6 is fixed in a manner which is sufficiently leaktight and secure in terms of position, taking into account also the prevailing internal pressure, through contact between the contact lips 24 and 26 and the respective sides of the wall of the compensating space 4. The cap-type cover 6 can simply be pushed or screwed onto the first rod part 2. The inner contact lip 24 serves inter alia as a guide for the piston rod 8, with a longer length improving guidance—The length of the outer contact lip 26, on the other hand, can be designed for adequately firm seating of the cap-type cover 6.

The central opening 27 has a passage with two passage sections 28 and 29. A first passage section 28 extends from the outside inward and merges stepwise into a second passage section 29, which opens into the interior of the compensating space 4. The first passage section 28 has a smaller clear diameter than the second passage section 29 relative to a center line X of the tie rod 1.

In a preferred embodiment, the diameter of the first passage section 28 is matched to an outer circumference of the engagement end 7 or piston rod 8 thereof in such a way that sealing is possible even when the piston rod 8 is moving axially. It is, of course, also possible to provide additional sealing measures, e.g. sealing lips. By way of example, an annular gap 31 is arranged between the outer circumference of the piston rod 8 and the inside diameter of the second passage section 29. Of course, the cap-type cover 6 can be embodied with a central opening which has just one passage section of constant diameter, which case the diameter should then be matched to the outer circumference of the piston rod 8 to ensure sealing, and secondary sealing measures can be provided if this is required.

The cap-type cover 6 can be formed from a suitable material, e.g. from a plastic.

It is possible to embody the cap-type cover 6 in several parts and to combine them into a single component including the piston rod 8. It is also conceivable first of all to introduce the piston rod 8 into the compensating space 4, to push on the cap-type cover 6 onto the piston rod 8 from the free end of the latter, and then to connect the piston rod 8 to the rest of the second rod part 3, e.g. by welding, adhesive bonding or some other suitable connecting method.

FIG. 1 shows an assembled condition of the two rod parts 2 and 3, in which the tie rod 1 can advantageously adapt its compliance virtually automatically, in particular as a function of a vehicle speed.

On the one hand, the pressurized medium reservoir 18 serves to accommodate the compensating medium displaced from the compensating space 4. The switching element 17 is then arranged between the compensating space 4 and the medium reservoir 18.

The medium reservoir 18 is advantageously pressurized by means of the pressurization element 22. Under the action of a spring force, the pressure plate 23 tends to push the compensating medium back into the compensating space 4. By means of the interaction between the medium reservoir 18, the compensating space 4, the pressurization element 23 and the switching valve 17, the adjustable springiness or compliance of the tie rod 1 can be set to match the application, preferably according to the differing speeds of the vehicle.

The engagement end 7, which enters the compensating space 4, or the effective piston surface 11 thereof displaces the compensating medium transferred to the medium reservoir 18 by the switching element 17 or solenoid valve 17. The pressurization of the medium reservoir 18, on the other hand, means that the compensating fluid has a tendency to push back through the switching element 17 into the compensating space 4. If the pressurization of the medium reservoir 18 is greater than the tendency of the engagement end 7 of the tie rod 1 to enter the compensating space 4, the engagement end 7 is pushed back out of the compensating space 4, and the tie rod returns to the initial position/design position, which is preferably defined by the inner contact lip 24.

The advantage of the inner contact lip 24 is evident here, it being possible for the axial extent thereof to be dimensioned such that the initial position/design position of the tie rod 1 can be set in a defined manner by limiting the possible axial movement.

Provision is preferably made for the switching element 17 or solenoid valve to be switched only in an on/off manner. Here too, the movement limitation provided by the inner contact lip 24 is extremely advantageous. It would thus be possible to provide for switching of the switching element at a predetermined speed. It would be possible to bring this about by connection to a control unit or to the already existing central control unit of the vehicle, in which a large number of data can be collected, and which could generate an appropriate switching signal for the switching element. Fundamentally, the design position or initial position, i.e. the length of the tie rod 1, has to be maintained for reasons connected with steering kinematics. Holding the piston rod 8 fast at a position other than the defined design position would produce an unwanted constant change in the steering angle, even without the action of a transverse force. Purely on the basis of external transverse forces during steering at high speed, an activatable compliance can be permitted according to the'invention. Retraction of the piston rod 8 against the spring pressure produces a desired countersteering effect. To this extent, activation/deactivation of the switching element is preferred. However, it is also possible to produce advantageous variable damping behavior through stepwise/stepless variation of the aperture cross section in the switching element 17. However, the switching element 17 should always be slightly open for return flow, i.e. not completely closed, to enable the link, i.e. the tie rod to be pushed back as quickly as possible, that is to say virtually immediately, into the design position, in a manner defined by the inner contact lip 24, in the case of an equilibrium of forces between a declining transverse force (e.g. transition from cornering to straight ahead travel) and the spring force in the medium reservoir 18. The spring force of the tuning parameters is advantageous here for transverse force understeer of the desired intensity. The lockable oil column is used as a medium for transmitting force to the piston or piston rod 8.

Of course, the gaps that can be seen in FIG. 1 between the pressure plate 22 and the medium reservoir 18 are sealed off or capable of being sealed off.

What is claimed is:

1. A tie rod for a motor vehicle wheel suspension, the tie rod comprising:
    a first rod part (2) having a single compensating space (4) filled with a compensating medium, a medium reservoir (18), and a single medium flow passage (16) enabling fluid communication between the reservoir (18) and the compensating space (4);
    a second rod part (3) having an end positioned within the compensating space (4) and in contact with the medium; and
    a switching element (17) positioned for controlling a flow of compensating medium between the reservoir (18) and the compensating space (4).

2. The tie rod as claimed in claim 1, wherein the compensating space (4) is of cylindrical design when viewed in longitudinal section and is open at one end, and wherein an engagement end (7) of the second rod part (3) has a piston rod (8), which has an effective piston surface (11) at the end.

3. The tie rod as claimed in claim 1, further comprising a-connecting element (19) having a duct (16) which is introduced into a wall of the compensating space (4) on a side oriented toward an effective piston surface (11) of an engagement end (7) of the second rod part (2).

4. The tie rod as claimed in claim 1, wherein the medium reservoir (18) is pressurized and preferably has a pressurization element (22).

5. The tie rod as claimed in claim 1, wherein the compensating medium is a fluid, preferably a hydraulic oil.

6. The tie rod as claimed in claim 1, wherein the switching element (17) is embodied as a solenoid valve (17).

7. The tie rod of claim 1 further wherein the second rod part (3) includes an effective piston surface (11) facing the compensating space, and a single annular surface (12) positioned opposite the effective piston surface (11).

8. A wheel suspension including a tie rod in accordance with claim 1.

9. The tie rod of claim 1 wherein the compensating space (4) is filled with a single continuous mass of compensating medium.

10. A wheel suspension for a motor vehicle, which has a tie rod (1) formed from two rod parts (2, 3), wherein the first rod part (2) has a compensating space (4) filled with a compensating medium, in which the other, second rod part (3) is arranged by means of the engagement end (7) thereof, the compensating space (4) being connected to a medium reservoir (18) via a switching element (17) arranged at a connecting element (19), and wherein the medium reservoir (18) has a spring-loaded pressure plate (23) and is pressurized in this way.

11. A wheel suspension for a motor vehicle, which has a tie rod (1) formed from two rod parts (2, 3),
wherein
the first rod part (2) has a compensating space (4) filled with a compensating medium, in which the other, second rod part (3) is arranged by means of the engagement end (7) thereof, the compensating space (4) being connected to a medium reservoir (18) via a switching element (17) arranged at a connecting element (19),
and wherein
for the purpose of sealing the compensating space (4), the first rod part (2) has a cap-type cover (6) with a central opening (27) and two contact lips (24, 26) of different lengths when viewed in longitudinal section, an inner contact lip (24) being made longer when viewed in longitudinal section than the outer contact lip (26) situated opposite the latter, a wall section of the compensating space (4) being accommodated between the two contact lips (24, 26), and the engagement end (7) being passed through the central opening (27).

12. A wheel suspension for a motor vehicle, which has a tie rod (1) formed from two rod parts (2, 3),
wherein
the first rod part (2) has a compensating space (4) filled with a compensating medium, in which the other, second rod part (3) is arranged by means of the engagement end (7) thereof, the compensating space (4) being connected to a medium reservoir (18) via a switching element (17) arranged at a connecting element (19),
and wherein
a cap-type cover (6) is provided for the purpose of sealing the compensating space (4), the cover (6) having a central opening (27) which has two opening sections (28, 29) when viewed in longitudinal section, of which a first opening section (28) has a smaller diameter than an adjoining second opening section (29), the first opening section (28) resting against an outer circumference of the engagement end (7) in a sealing manner, and the second opening section (29) being open toward an annular surface (12) of the engagement end (7), said annular surface being situated on the opposite side from an effective piston surface (11), and an annular gap (31) being arranged between the outer circumference of the engagement end (7) and the inner circumference of the second opening section (29).

\* \* \* \* \*